UNITED STATES PATENT OFFICE.

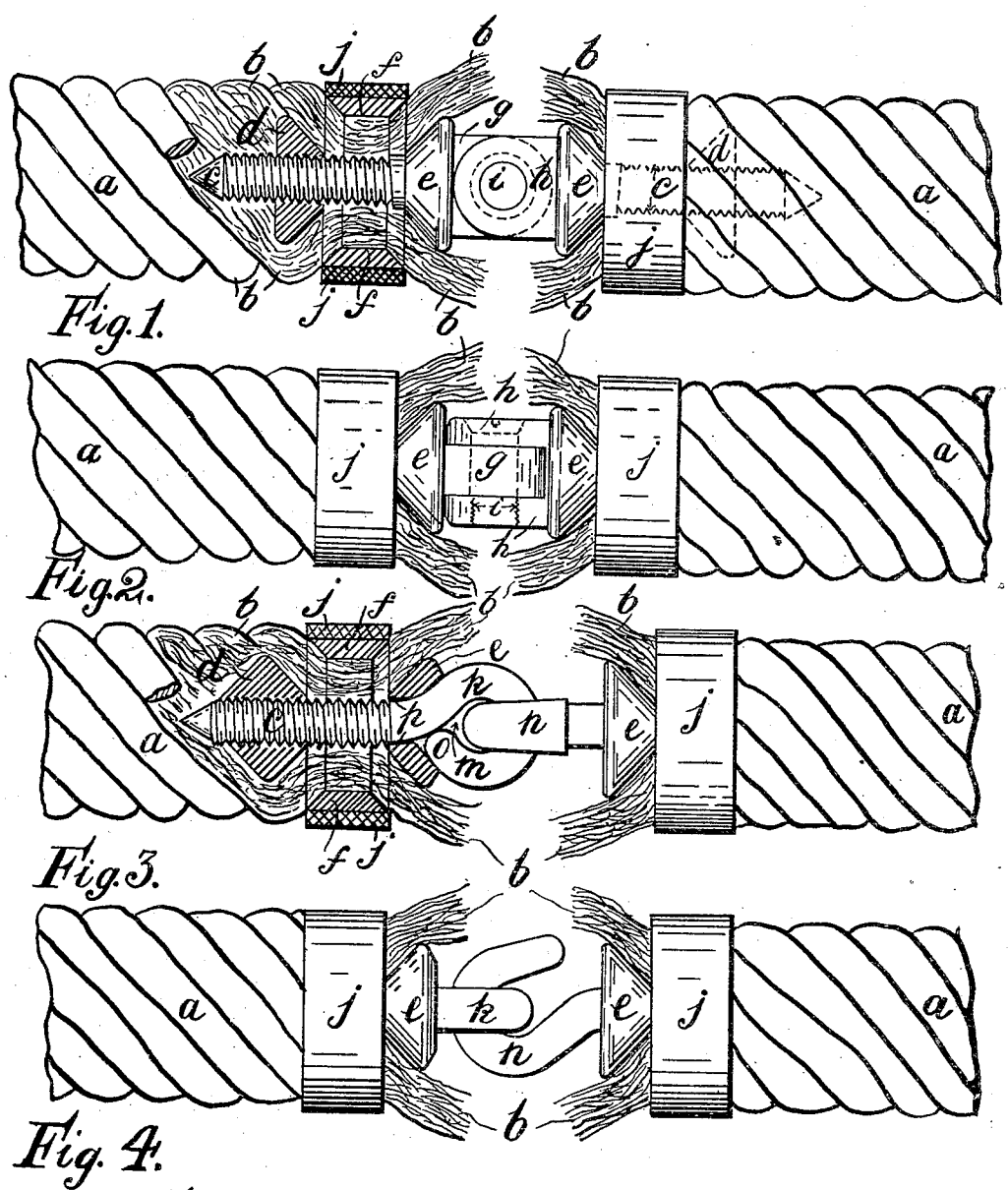

WILLIAM SHUFFLEBOTTOM AND THOMAS KENWORTHY, OF ASHTON-UNDER-LYNE, ENGLAND.

ROPE-COUPLING.

943,168. Specification of Letters Patent. Patented Dec. 14, 1909.

Application filed March 27, 1909. Serial No. 486,214.

*To all whom it may concern:*

Be it known that we, WILLIAM SHUFFLEBOTTOM and THOMAS KENWORTHY, subjects of the King of Great Britain and Ireland, and residents of Ashton-under-Lyne, in the county of Lancaster, England, joiner and grocer, respectively, have invented certain new and useful Improvements in Rope-Couplings, of which the following is a specification.

Our invention relates to means for splicing or forming a joint in connection with stranded ropes, such as those made from hemp or the like flexible material, though it may be applied in connection with ropes made of other flexible material, the object being to provide means secured to the joining ends of the rope which will enable such ends to be readily coupled together or be uncoupled, a further object being the construction of a joining device which will pass easily around a grooved pulley and not make any noise in doing so.

Our invention consists essentially of a screw applied to each end of the rope, a conical nut on the screw, a conical fixed or loose or adjustable collar in opposition to the nut, a ferrule for use in conjunction with the cones and a knuckle, screwed, hooked or other form of joint between the two screws for coupling and uncoupling purposes.

Our invention will be fully described with reference to the accompanying drawings in which, Figure 1 is an elevation of the ends of the rope to be joined with our improved fastening device applied thereto, the left hand end of the rope being partly in section, Fig. 2 plan of same. Fig. 3 corresponding view to Fig. 1 of a modified form of the invention and Fig. 4 plan of same.

In carrying out our invention in connection with a stranded hemp rope such as $a$ we uncoil the strands $b$ for a short distance at each end and place in the center of the uncoiled portion an axial screw $c$ which is preferably pointed at its inner end and carries a conical nut $d$, the apex of which points outward toward the end of the rope. The outer end of the screw is formed with a conical collar or shoulder $e$, or has fixed on it a loose cone whose apex points in the opposite direction to the first cone. In conjunction with the screw and cones we employ a ferrule $f$, the ends of which may be beveled inward, as indicated in the left hand portion of Fig. 1 and through this ferrule we pass the strands $b$ of the rope so as to leave the ferrule midway between the two cones. By turning the screw around the two cones are drawn together so as to press the strands $b$ outwardly against the inner surface of the ferrule and thereby firmly wedge them in position. The outer end of each screw may be so formed that in conjunction they establish a joint which can be readily coupled or uncoupled. Thus a form of knuckle joint may be employed, such as is indicated in the drawings, the outer end of one screw having a tenon end $g$ while the outer end of the other is forked at $h$ to embrace it, a transverse pin $i$ being passed through holes in both to couple them. The pin may be screwed at one end so as to engage with corresponding threads in one side of the fork $h$. On the other hand any other suitable form of connection which admits of ready engagement or disengagement but remains secure while the rope is in use may be employed.

One such form of modified arrangement is indicated in Figs. 3 and 4, in which similar letters refer to corresponding parts of the device shown in Figs. 1 and 2. In this the principal modification is in the means of coupling the screws $c$. For this purpose one is formed with a ring or loop $k$ at its outer end having an elongated hole $m$, while the other is provided with a hook $n$, the extreme end of which substantially corresponds in width with the length of the hole $m$ while being wider than the latter transversely. With this arrangement the two screws are coupled by turning one at right angles to the other, inserting the hook $n$ through the hole $m$ and then turning them back into axial line. No disengagement, therefore, can occur during normal working of the coupling, but only by reversing the operation described. Further, this type of connection gives flexibility in all directions that the rope may assume. The free end $o$ of the loop $k$ may be prevented opening by dishing out the cone $e$ at the base $p$ and making it slidable on the screw $c$ so that such dished portion projects over the end $o$ when the parts are in working position. The cone $e$ on the second screw may be tapped and adjusted thereon axially, while the conical nuts $d$ may be of double cone formation, as indicated in the drawings, so enabling the strands of the rope to lie more snugly around them than the corresponding cones shown in Figs. 1 and 2.

With the arrangements described the ends of the rope can be very easily coupled and uncoupled and be shortened, if necessary, from time to time to enable slack to be taken up. And in order to prevent the improved joint from making a noise when passing around a pulley we may wrap around each ferrule, or mold on it a composition coating such as gutta percha, rubber or the like *j*.

What we claim is:

1. The combination, with two ropes, of two screws inserted axially in the ropes and pivotally connected together, a conical nut and a conical collar on each screw, and ferrules having internal conical end portions, each ferrule being arranged between a nut and a collar and the strands of the ropes being clamped between the opposed conical surfaces.

2. The combination, with two ropes, of two screws inserted axially in the ropes and pivotally connected together, a conical nut and a conical collar on each screw, ferrules having internal conical end portions, each ferrule being arranged between a nut and a collar and the strands of the ropes being clamped between the opposed conical surfaces, and a tubular casing of soft material encircling the said ferrules.

In testimony whereof we have hereunto set our hands in the presence of two witnesses.

WILLIAM SHUFFLEBOTTOM.
THOMAS KENWORTHY.

Witnesses:
WILLIAM H. TAYLOR,
AMY E. EVINS.